Oct. 26, 1943.  C. C. BENNETT  2,332,690
REMOTE CONTROL MECHANISM
Filed April 28, 1941    2 Sheets-Sheet 1

INVENTOR
Claude C. Bennett
BY
Gray & Smith
ATTORNEYS.

Oct. 26, 1943.  C. C. BENNETT  2,332,690
REMOTE CONTROL MECHANISM
Filed April 28, 1941   2 Sheets-Sheet 2
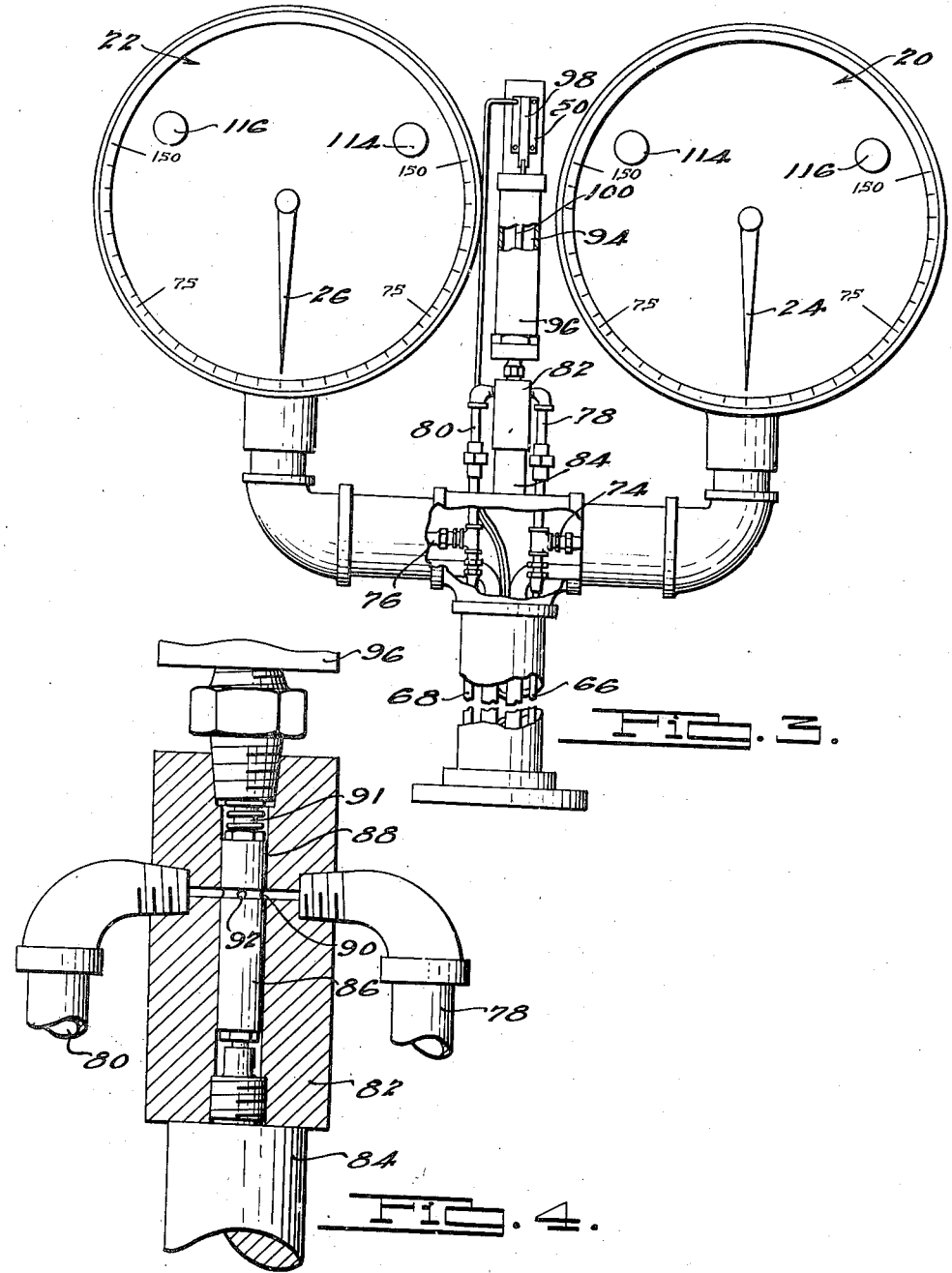
INVENTOR
Claude C. Bennett.
BY
Gray & Smith
ATTORNEYS.

Patented Oct. 26, 1943

2,332,690

UNITED STATES PATENT OFFICE 2,332,690

REMOTE CONTROL MECHANISM

Claude C. Bennett, South Bend, Ind.

Application April 28, 1941, Serial No. 390,758

8 Claims. (Cl. 33—203)

This invention relates to automobile service equipment and more particularly to remotely spaced means for indicating the operating conditions of movable parts of a motor vehicle.

It is desirable in the operation of service equipment such for example as turntables, Ouija boards and gauges of various kinds utilized to determine and indicate the condition of alignment of steerable wheels, and other mechanisms employed to determine and indicate the operating condition or the condition of adjustment of movable portions of a vehicle, such for example as power testers of various kinds such as dynamometers, to position indicating dials at a sufficient distance from the vehicle that the operator and customer can simultaneously observe the operating conditions of a plurality of various elements undergoing tests simultaneously or successively.

Various means have been provided heretofore to indicate at a distance the operating conditions of component portions of a vehicle. One such remote indicating means resides in the use of Selsyn electric motors operatively connected to a pointer associated with a dial and to a shaft or other movable element of a piece of service equipment utilized to determine the operating or adjustment conditions of the component portions of a motor vehicle. This expedient is objectionable because of the fact that Selsyn motors are so expensive that their use to give remote indication so increases the cost of the equipment that they have not come into popular use.

Another form of mechanism utilized to give a remote indication of the operating conditions of the component portions of a vehicle is the use of hydraulically actuated motion transmitting means whereby a piston operatively associated with a piece of service equipment is slidably mounted in a cylinder to transmit liquid pressure through a conduit to move another piston slidably mounted in a cylinder and connected to the pointer of the indicating means. This embodiment is objectionable because service equipment is used in garages and other places where the temperature of the atmosphere varies through wide limits and contraction and expansion of the liquid introduces inaccuracies in the indicating means. It is therefore necessary to manually reset the indicator of the dial mechanism to the zero position each time the temperature varies sufficiently to move the indicating hand from the zero position. The necessity for thus manually setting the indicating hand is objectionable because frequently the operator forgets to reset the pointer to zero whereupon variations of temperature result in a faulty reading of the gauge.

An object of this invention is therefore to provide automatically operable means to compensate variations in temperature in a motion transmitting means utilized to indicate at a distance the operating condition of the mechanical constituents of a motor vehicle.

Another object of this invention resides in the provision of a fluid reservoir operatively connected into a fluid circuit when the device is in an inoperative position and wherein means operated by initial movement of a movable member are provided to isolate the reservoir from the fluid circuit immediately that the mechanism is operated.

Yet a still further object is to provide means actuated by a substantially predetermined movement of a movable member to actuate a tolerance indicating mechanism to indicate whether a device undergoing test is operating within substantially predetermined operating limits.

A further object resides in the provision of tolerance adjustment mechanism whereby an indication can be made of the operating condition or the condition of adjustment of a movable portion of a motor vehicle to indicate whether or not the mechanism is operating within substantially predetermined limits as indicated by a visible gauge.

Still another object of the invention resides in the provision of electrically controlled means to isolate a liquid reservoir from a liquid actuated motion transmitting mechanism immediately upon actuation of the device.

Still another object of the invention is to provide adjustable means to vary the extent of movement of an indicating mechanism by a substantially predetermined movement of an actuating member operatively connected with a movable portion of a piece of service equipment.

Yet a still further object of the invention resides in the provision of a relatively simple yet rugged remote indicator which may be economically manufactured and used to accurately indicate the operating conditions of a movable member.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 3 is a part sectional view illustrating the indicating mechanism of Fig. 1.

Fig. 4 is an enlarged sectional view of a portion of the device illustrated in Fig. 3.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
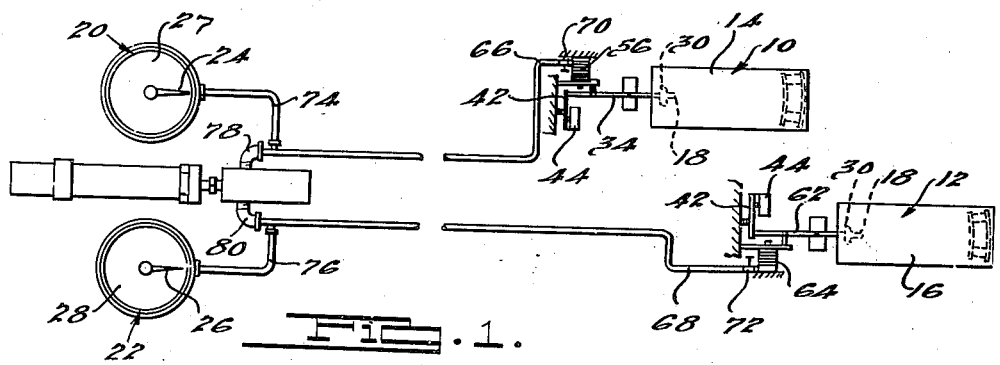
Fig. 1 is a diagrammatic view illustrating one desirable embodiment of the invention as applied to a wheel aligner to indicate the condition of alignment of steerable wheels of a motor vehicle, the right hand portion of the device being indicated in plan view and the left hand portion in elevation.

Referring now to Fig. 1, it will be observed that the invention is illustrated as being applied to longitudinally spaced wheel aligning devices 10 and 12 positioned to be successively engaged by the steerable wheels of a motor vehicle. The aligning devices 10 and 12 have runner boards 14 and 16 respectively pivoted at 18 to move laterally about said pivot under the influence of side thrust exerted by the steerable wheels as they pass over the runner boards 14 and 16.

Indicating means such for example as gauges 20 and 22 having pointers 24 and 26 respectively operably connected to the spaced runner boards 14 and 16 respectively may be provided to indicate at a distance from the aligning devices the condition of alignment of the steerable wheels. The gauges 20 and 22 are provided with dials 27 and 28 respectively calibrated to indicate feet of side slip per mile. It will of course be understood that my invention may be applied to other items of service equipment and may be used in any installation where the movement of members actuated either successively or simultaneously are recorded at a distance. It will also be apparent that if desired more than two gauges may be actuated by a corresponding number of remotely spaced movable members.

A bracket 30 suitably attached to each of the runner boards 14 and 16 receives the pivot 32 about which each of the plates 14 and 16 oscillates to indicate the condition of alignment of the steerable wheels of the vehicle. Each of the brackets 30 is provided with a longitudinally extending arm 34. Each arm 34 is provided with a longitudinally extending slot 36 and has its end notched as at 38 to receive the point of a screw 40 adjustably mounted in an arm 42 operably connected with a microswitch 44 and yieldingly urged by a spring 46 to maintain the microswitch in the inoperative position when the point of the screw 40 is positioned in the notch 38 of the arm 34. The microswitch 44 is operably connected by electric leads 48 with a solenoid 50 more clearly illustrated in Fig. 3 whereby upon actuation of the microswitch 44 by lateral movement of the arm 34 to disengage the point of the screw 40 from the notch 38, the solenoid 50 is energized.

Lateral movement of the arm 34 is transmitted through a link 52 and a lever 54 to actuate a Sylphon 56 supported at one end on a stationary portion 58 of the framework of the wheel aligner and connected at its other end to the lever 54 pivoted to the framework of the wheel aligner by a stud 60. The lever 54 is slotted longitudinally corresponding with the slot 36 of the arm 34 whereby the adjustable link 52 may be moved longitudinally in the slots to vary the lever arm of the connecting linkage. The Sylphon 56 is adjustably mounted in suitable guides carried by the stationary portion 58 and in a slot formed in the lever 54.

The wheel aligning device 12 may be provided with a similar actuating mechanism including an arm 62 operably connected to actuate a Sylphon 64.

The Sylphons 56 and 64 contain a liquid and are operably connected through conduits 66 and 68 having shut-off valves 70 and 72 with conduits 74 and 76 communicating with corresponding liquid pressure actuated means operably connected to actuate each of the pointers 24 and 26 of the gauges 20 and 22 respectively to indicate the out-of-line condition of the steerable wheels in feet of side slip per mile. If the arms 34 or 62 are moved towards the Sylphons 56 or 64 respectively as viewed in Figs. 1 and 2, positive pressure will be developed within the Sylphons 56 and 64 and transmitted through the conduits 66 and 68 to move the pointer 24 in the clockwise direction and to move the pointer 26 in counterclockwise direction. If the arms 34 or 62 are moved away from the Sylphons 56 and 64 by movement of the steerable wheel over the plates 14 and 16, the Sylphons 56 or 64 will be extended thereby exerting negative pressure through the conduits 66 and 68 to move the pointers 24 and 26 in the opposite directions as illustrated in Figs. 1 and 3.

The conduits 66 and 68 communicate with conduits 78 and 80 respectively connected with a valve housing 82 carried by a stem 84 and provided with a hollow slide valve 86 slidably mounted in a bore 88. The slide valve 86 is provided with a circumferentially extending groove 90 and a cross bore 92 whereby when the slide valve 86 is in the neutral or inoperative position illustrated in Fig. 3, the conduits 78 and 80 communicate by way of the circumferential groove 90 and cross bore 92 with a passage extending longitudinally of the slide valve 86. The longitudinal passage of the valve 86 communicates with a liquid reservoir 94 formed in a cylinder 96. The valve 86 may be actuated by a rod 100 extending through the cylinder 96 and operably connected to a core 98 of the solenoid 50.

Figure 2:
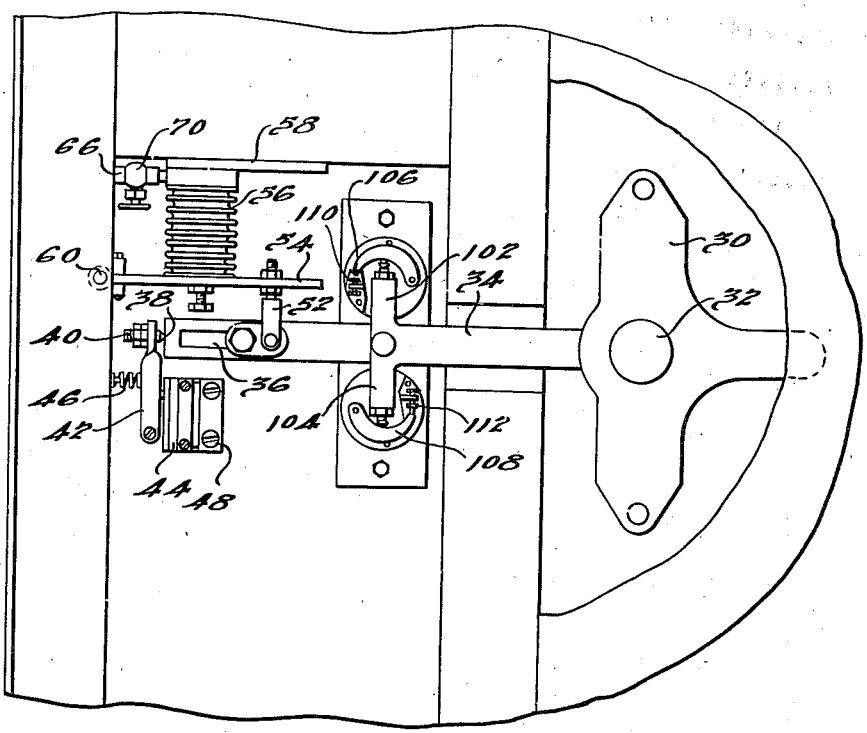
Fig. 2 is an enlarged plan view of a portion of the operating mechanism illustrated in Fig. 1.

When the device is in the inoperative position with the arms 34 and 62 in the neutral positions illustrated in Fig. 2, wherein the point of the screw 36 engages within the notch 34 of the arms, the slide valve 86 is in the inoperative position illustrated in Fig. 4 interconnecting the reservoir 94 through the slide valve 86, circumferential groove 90, cross bore 92 and conduits 78 and 80 with the conduits 66 and 68 to supply additional liquid to the system or to permit liquid to flow from the system to compensate variations in temperature. The pointers 24 and 26 of the gauges 27 and 28 are thus always in the neutral or zero position when the device is not functioning. Mistakes or misreading of the dial due to variation of temperature are thus eliminated.

When the device is initially operated, the first movement of the arms 34 and 62 from the neutral positions illustrated in Fig. 2 causes the point of the screw 40 to disengage the notch 38 in each of the arms thereby elevating the arms 42 against the resistance of the spring 46 to energize or actuate the microswitch 44. Actuation of the microswitch 44 transmits electrical energy through the electric leads 48 to energize the solenoid 50 whereupon the core 98 of the solenoid elevates the rod 100 to move the valve member 86 longitudinally in the bore 88 of the valve chamber 82. The circumferential groove 90 is thus moved out of alignment with the conduits 78 and 80 and communication between the reservoir 94 and the conduits 66 and 68 is interrupted. Movement of the arms 34 or 62 is then transmitted through the solenoids 56 or 64, conduits 66 and 68, conduits 74 and 76 to the fluid pressure actuated means associated with the gauges 20 and 22 whereupon the needles 24 and 26 are actuated to indicate the operating condition of the mechanism.

If it is desired to give a quick check-up on the operating condition of component portions of a motor vehicle in rapid succession, such for example as in inspection service where it is desired to determine whether or not the operating mechanisms of a motor vehicle fall within substantially predetermined specifications, laterally extending arms 102 and 104 carried by each of the arms 34 and 62 operably connected to electric switches 106 and 108 respectively may be provided to permit actuation of electric contact points 110 and 112 respectively if the arms 34 or 62 move laterally a substantially predetermined distance. Actuation of the switches 106 and 108 may be employed to energize tolerance lights 114 and 116 positioned in the face of each of the gauges 20 and 22 respectively.

I claim:

1. In a device for checking the operative condition of a movable element of a motor vehicle, a member movable proportionately to the accuracy of the operative condition of said element, a gauge including a dial and a pointer remotely spaced from said movable member, motion transmitting means interposed between the movable member and the pointer, means to compensate variations of movement of the pointer by change of temperature, and electrically controlled means operated by movement of the movable member to render the compensating means inoperative.

2. In a remote indicator for a piece of service equipment for a motor vehicle, a movable member to indicate the accuracy of running conditions of a portion of said vehicle, a gauge remotely spaced from the movable member, liquid actuated motion transmitting means between the movable member and gauge, means including a liquid reservoir to compensate variations of temperature, and electrically controlled means actuated by movement of the movable member to render the compensating means inoperative.

3. In a remote indicator, a movable member, a gauge remotely spaced from the movable member, liquid actuated motion transmitting means between the movable member and gauge, means including a liquid reservoir operatively connected to the liquid actuated motion transmitting means to compensate variations of temperature, and valve means operative in one position to interrupt the connection between the reservoir and the liquid actuated motion transmitting means, and electrical means operative by movement of said movable member to move the valve means to the position to interrupt the connection between the reservoir and the liquid actuated motion transmitting means.

4. In a remote indicator for vehicle service equipment, a movable member, a gauge remotely spaced from the movable member, liquid actuated motion transmitting means between the movable member and gauge, means including a liquid reservoir operatively connected to the liquid actuated motion transmitting means to compensate variations of temperature, valve means operative in one position to interrupt the connection between the reservoir and the liquid actuated motion transmitting means, and electrical means including a switch operated by movement of said movable member and a solenoid actuated by operation of the switch to move the valve means to the position to interrupt the connection between the reservoir and the liquid actuated motion transmitting means.

5. In a wheel aligning device, a runner board positioned to be engaged by a steerable wheel of a motor vehicle, a gauge remotely spaced from the runner board, an arm carried by the runner board and movable angularly in opposite directions from a neutral position by movement in opposite directions of its associated runner board, liquid actuated motion transmitting means between said arm and guage, liquid volume compensating means including a reservoir, connecting means between the reservoir and the liquid actuated motion transmitting means, valve means controlling said connecting means, a solenoid controlling the valve means, and electric switch means operated by movement of said arm from its neutral position to actuate the solenoid to interrupt the connecting means between the reservoir and the liquid actuated motion transmitting means.

6. In a motion transmitting mechanism, a movable member, a gauge remotely spaced from the movable member, an arm carried by the movable member and movable angularly from a neutral position by movement of its movable member, liquid actuated motion transmitting member between said arm and gauge, liquid volume compensating means including a reservoir, connecting means between the reservoir and the liquid actuated motion transmitting means, valve means controlling said connecting means, an electrical solenoid controlling the valve means, and means including an electric switch operated by movement of said arm from the neutral position to actuate the solenoid to interrupt the connecting means between the reservoir and the liquid actuated motion transmitting means.

7. In a wheel aligning device, a runner board positioned to be engaged by the steerable wheel of a motor vehicle, a gauge remotely spaced from the runner board, an arm carried by the runner board and movable angularly in opposite directions from a neutral position by movement in opposite directions of its runner board, liquid actuated motion transmitting means including expansible and contractable Sylphons between said arm and gauge, liquid volume compensating means including a liquid reservoir, connecting means between the reservoir and the liquid actuated motion transmitting means comprising longitudinally movable valve means having a circumferentially extending groove and a cross slot communicating with the reservoir and the liquid actuated motion transmitting means, a solenoid controlling the valve means to move the valve means longitudinally to interrupt communication between the reservoir and the liquid actuated motion transmitting means, and means including electric switches operated by movement of said arm from its neutral position to actuate the solenoid to move the valve means and interrupt the connecting means between the reservoir and the liquid actuated motion transmitting means.

8. In a remote indicator for wheel aligning equipment, an angularly movable runner board, a gauge remotely spaced from the runner board, liquid actuated motion transmitting means between the movable member and gauge, means including a liquid reservoir operatively connected to the liquid actuated motion transmitting means to compensate variations of temperature, valve means operative in one position to interrupt the connection between the reservoir and the liquid actuated motion transmitting means, and electrical means including a switch operated by a predetermined movement of said movable member and a solenoid actuated by operation of the switch to move the valve means to the position to interrupt the connection between the reservoir and the liquid actuated motion transmitting means.

CLAUDE C. BENNETT.